United States Patent
Meinherz

(10) Patent No.: US 6,624,360 B2
(45) Date of Patent: Sep. 23, 2003

(54) OUTDOOR HIGH-VOLTAGE BUSHING, AND A HIGH VOLTAGE SWITCHING DEVICE HAVING SUCH A BUSHING

(75) Inventor: Manfred Meinherz, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/891,146

(22) Filed: Jun. 26, 2001

(65) Prior Publication Data

US 2002/0017394 A1 Feb. 14, 2002

(30) Foreign Application Priority Data

Jun. 28, 2000 (DE) .......................... 100 32 656

(51) Int. Cl.$^7$ .............................................. H01B 17/26
(52) U.S. Cl. .................. 174/152 R; 174/142; 174/145; 174/167
(58) Field of Search ............................ 174/152 R, 142, 174/145, 167, 168, 176, 178, 179, 194, 14 BH, 18; 218/155, 157

(56) References Cited

U.S. PATENT DOCUMENTS

| 3,160,701 A | * | 12/1964 | King et al. .................... 174/18 |
| 3,231,666 A | * | 1/1966 | Frink .......................... 174/142 |
| 4,016,382 A | | 4/1977 | Roth ....................... 200/148 R |
| 4,358,631 A | | 11/1982 | Matsuda ................. 174/15 BH |
| 6,291,786 B1 | * | 9/2001 | Gericke et al. ............. 218/152 |
| 6,307,172 B1 | * | 10/2001 | Bolin et al. ................. 218/155 |

FOREIGN PATENT DOCUMENTS

| DE | 27 48 002 | 5/1978 |
| DE | 27 08 359 | 8/1978 |
| DE | 39 15 699 A1 | 11/1990 |
| DE | 195 11 168 A1 | 10/1996 |
| EP | 0 744 758 A2 | 11/1996 |

* cited by examiner

Primary Examiner—Dean A. Reichard
Assistant Examiner—W. David Walkenhorst
(74) Attorney, Agent, or Firm—Morrison & Foerster LLP

(57) ABSTRACT

A bushing, which normally includes an insulator, having a high-voltage connection and a metallic foot part, and an electrical conductor, the foot part of the insulator) is in the form of a curved housing part in which a post insulator for the electrical conductor is arranged. This configuration of the bushing allows the bushing to be arranged inclined on encapsulating housings in which the flange plane of the connecting flange for the bushing runs horizontally or vertically.

2 Claims, 2 Drawing Sheets

OUTDOOR HIGH-VOLTAGE BUSHING, AND A HIGH VOLTAGE SWITCHING DEVICE HAVING SUCH A BUSHING

CLAIM OF PRIORITY

This application claims the benefit to German Application No. 10032656.0, filed Jun. 28, 2000, the contents of which are hereby incorporated by reference.

TECHNICAL FIELD OF THE INVENTION

The invention relates to the field of electrical switches, and in particular, to the physical design of bushings such as those used in gas-insulated, encapsulated high-voltage systems for the current-carrying junction between a system and an overhead line or a transformer.

BACKGROUND OF THE INVENTION

Outdoor bushings of this type normally comprise a hollow insulator having a high-voltage connection arranged at the upper end of the insulator and having a foot part which grips the lower end of the insulator and is provided with a mounting flange, and an electrical conductor running in the axial direction of the insulator. The annular foot part of such a bushing is bonded or mechanically joined to the lower end of the insulator and has a mounting flange for mounting the insulator on a corresponding connecting flange of an encapsulating housing of the high-voltage system (DE 27 48 002 A1, U.S. Pat. No. 4,358,631A), or on a mounting flange of a tubular adapter associated with the encapsulating housing of a high-voltage system.

In order to maintain the necessary minimum separations between the outdoor connections that are at high-voltage potential, both for single-phase and polyphase switchgear assemblies at relatively high voltage levels and with the horizontally arranged switching devices being constructed to be as short as possible, it is normal to arrange the high-voltage bushings inclined to the vertical.

To this end, the switching devices may themselves be provided with connecting flanges inclined to the horizontal (EP 0 744 758 A2, U.S. Pat. No. 4,016,382A) or—if the connecting plane of the switching device flange runs horizontally—curved tubes may be connected in between, whose connecting flange associated with the high-voltage bushing is inclined to the horizontal (DE 39 15 699 A1). In order for such a switching device to have as small a transport volume as possible, it is also known not only to have the connecting flanges of the switching device be inclined horizontally, but also for curved tubes to be connected between the switching device and the high-voltage bushings. In the tubes, the flange plane of the connecting flange is likewise inclined to horizontally (U.S. Pat. No. 4,016,382A).

SUMMARY OF THE INVENTION

In one embodiment of the invention, there is an outdoor high-voltage bushing for an encapsulated high-voltage system. The invention includes, for example, a hollow insulator having a high-voltage connection arranged at the upper end; a foot part which grips the lower end and is provided with a mounting flange; and an electrical conductor running in the axial direction of the insulator, wherein the foot part is in the form of a curved housing part, in which the flange plane of the mounting flange is inclined at an angle, which is about less than 90°, to the axis of the insulator, and a post insulator is arranged in the foot part, on which a contact piece is mounted for connection of the electrical conductor and for connection of a current path of the encapsulated high-voltage system.

In another embodiment of the invention, there is an encapsulated high-voltage switching device arranged horizontally. The invention includes, for example, a horizontally arranged, tubular encapsulating housing with feeders and outgoers arranged transversely with respect to the axis of the encapsulating housing, the encapsulating housing having a connecting sleeve with a connecting flange for each feeder and outgoer, and each connecting flange having an associated outdoor high-voltage bushing, wherein a flange plane of at least one connecting flange is arranged horizontally, and the at least one connecting flange having an associated outdoor high-voltage bushing.

In one aspect of the invention, the outdoor high-voltage bushing comprises a hollow insulator having a high-voltage connection arranged at the upper end; a foot part which grips the lower end and is provided with a mounting flange; and an electrical conductor running in the axial direction of the insulator, wherein the foot part is in the form of a curved housing part, in which the flange plane of the mounting flange is inclined at an angle, which is about less than 90°, to the axis of the insulator, and a post insulator is arranged in the foot part, on which a contact piece is mounted for connection of the electrical conductor and for connection of a current path of the encapsulated high-voltage system.

BRIEF DESCRIPTION OF THE DRAWINGS

An exemplary embodiment of the arrangement is illustrated in the exemplary Figures, in which.

DETAILED DESCRIPTION OF THE PREFERRED EMBODIMENTS

The invention discloses the refining of a bushing such that it can be associated with the encapsulating housing of a high-voltage system in a manner which is convenient for assembly and with an arrangement inclined vertically.

The invention provides for the foot part of the insulator to be in the form of a curved housing part in which the flange plane of the mounting flange is inclined at an angle which is less than 90° to the axis of the insulator, and for a post insulator to be arranged in the foot part, on which post insulator a contact piece is mounted for connection of the electrical conductor and for connection of a current path of the encapsulated high-voltage system.

With regard to the refinement of the encapsulated high-voltage switching device, the invention provides for the flange plane of at least one connecting flange to be arranged horizontally, and for an outdoor high-voltage bushing having the features mentioned above to be associated with this connecting flange.

In one embodiment of the bushing, the previously normal annular foot part of the insulator and any tubular adapter which may be required form an integral, curved foot part which at the same time forms a mounting point for the relatively long electrical conductor arranged in the bushing. The insulator and conductor thus form an assembly which can be prefabricated to be compact, can be tested and can be installed. On the system side, in this case, the encapsulating housings which are intended for the connection of one or more bushings can be provided in a standard form with vertically aligned connecting sleeves whose flange plane thus runs horizontally; the refinement of the connecting sleeve is thus independent of whether a vertically standing bushing or a bushing inclined vertically is being installed. Similarly, the new bushing can be arranged on encapsulating housings which have a horizontally aligned connecting flange with a vertically running flange plane, as is normal, for example, when connecting a gas-insulated switchgear assembly to an overhead line or a transformer.

Figure 1:
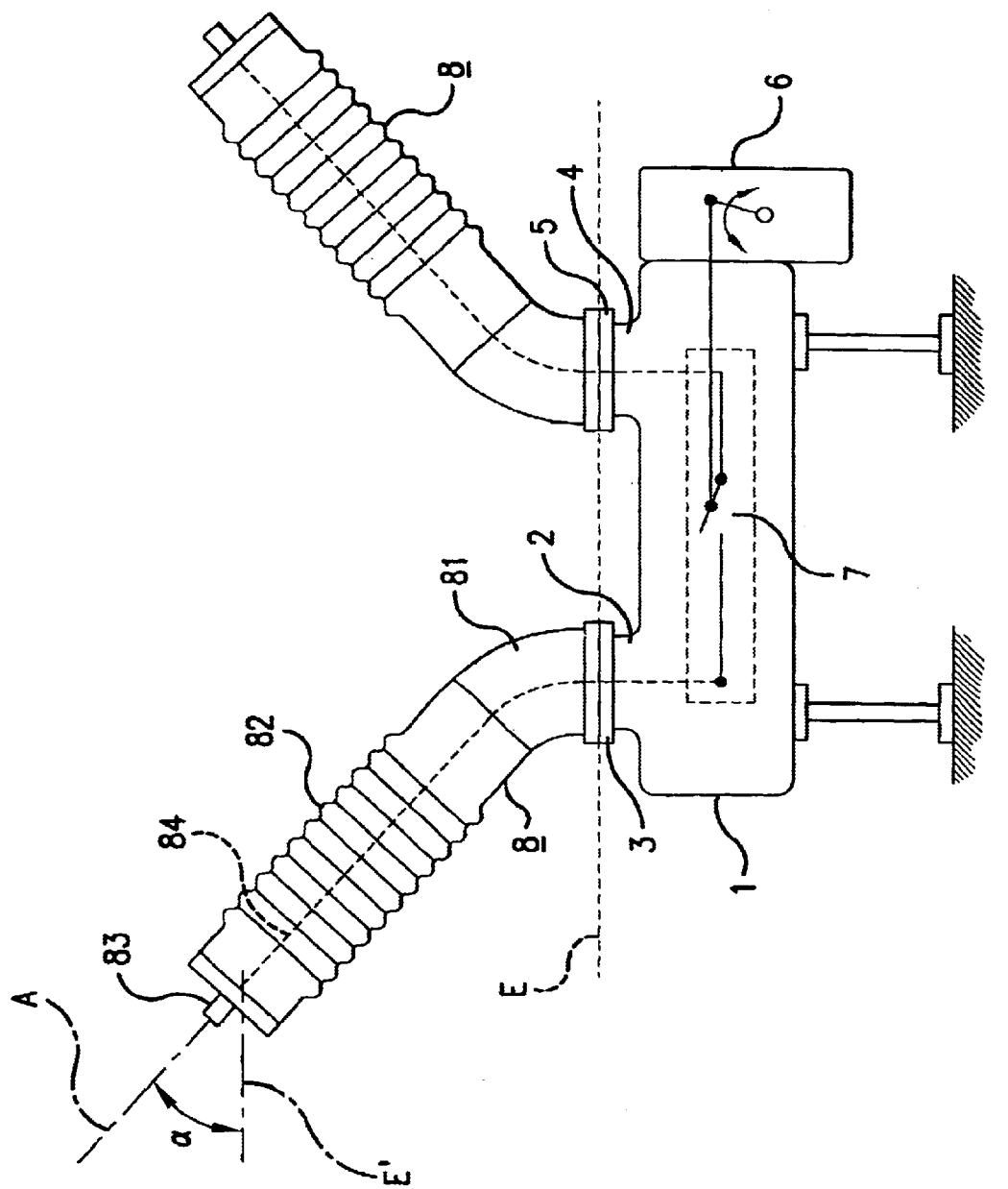
FIG. 1 shows a schematic illustration of an encapsulated embodiment of a horizontally arranged, single-phase high-voltage power breaker having two bushings.

FIG. 1 shows a high-voltage switching device in the form of a single-phase power breaker, with the actual switching unit 7 being arranged in a metallic encapsulating housing 1 which is substantially cylindrical and is arranged such that it lies horizontally. The encapsulating housing 1 is provided, transversely with respect to the axis of the housing, with a connecting sleeve 2 and a connecting sleeve 4, which end in a respective connecting flange 3 or 5. The actual switching unit 7 has an associated drive device 6 at one end of the encapsulating housing 1.

An outdoor high-voltage bushing is placed both on the connecting flange 3 and on the connecting flange 5, and comprises a metallic foot part 81, an insulator 82, a high-voltage connection 83 and an electrical conductor 82 running on the axis A of the insulator. The foot part 81 is in this case in the form of a curved housing part such that the axis A of the insulator is inclined through an angle α with respect to the horizontal connecting plane E of the connecting flange 3, and thus also with respect to the plane E' running parallel to it.

Figure 2:
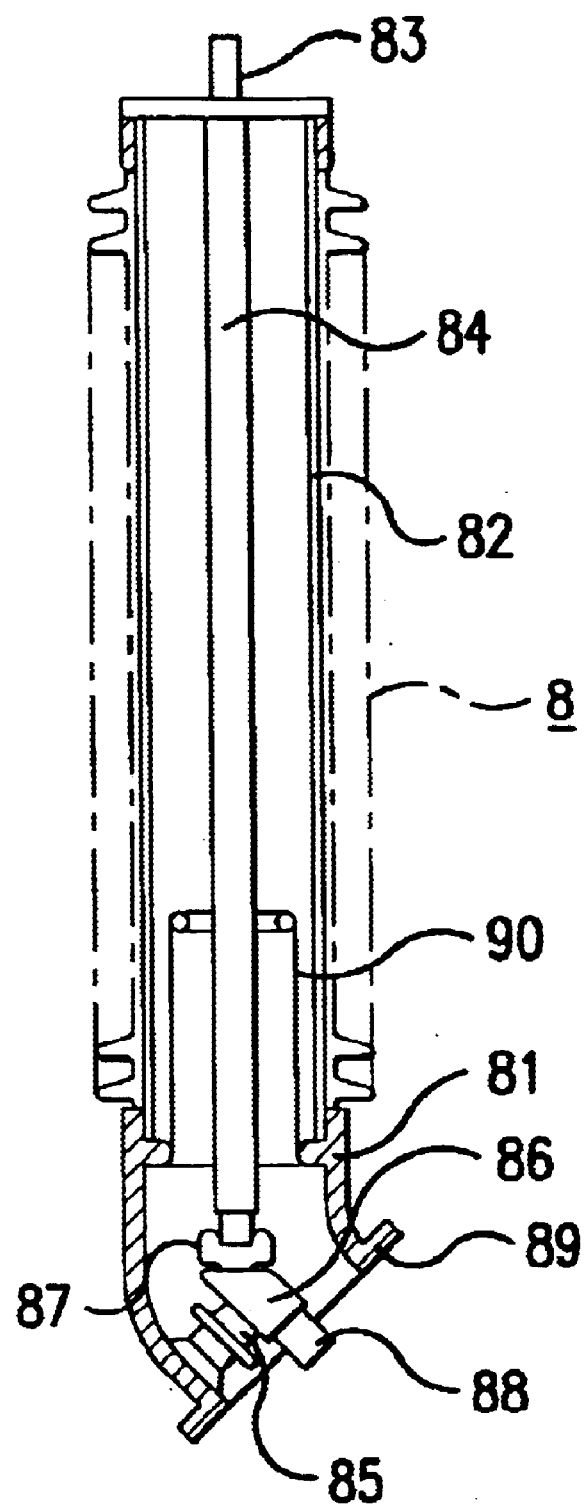
FIG. 2 shows the bushing used in the switch shown in FIG. 1.

According to FIG. 2, the curved foot part 81 of the bushing 8 is connected by an integral material joint to the lower end of the insulator 82 in the normal manner by bonding or gluing. A field control electrode 90, which projects into the insulator 82, is also supported on the foot part.

In addition, a post insulator 85 is arranged on the inner wall of the foot part 81 and is fit with a contact piece 86 which is used to deflect the current path of the conductor 84 to a corresponding connection in the encapsulating housing 1. To this end, the contact piece 86 is provided with a first connecting piece 87 into which the lower end of the conductor 84 can be inserted, and with a second connecting piece 88 which is used for plug-in connection to the associated current path of the actual switching unit 7.

This invention is not intended to be limited to the embodiments disclosed. One having ordinary skill in the art will recognize that this invention may be modified and varied in numerous emobidments consistent with the foregoing description.

What is claimed is:

1. An outdoor high-voltage bushing for an encapsulate high-voltage system, comprising:

a hollow insulator having a high-voltage connection arranged at an upper end;

a foot part which grips a lower end and is provided with a mounting flange; and an electrical conductor running in an axial direction of the hollow insulator, wherein the foot part is in the form of a curved housing part, in which a flange plane of the mounting flange is inclined at an angle, which is less than about 900, to an axis of the hollow insulator, and a post insulator supporting a contact tip with a first connecting piece and with a second connecting piece, the conductor configured to be plugged into the first connecting piece, while an electrical current path for the connection of the encapsulated high voltage system can be plugged into the second connecting piece.

2. An encapsulated high-voltage switching device arranged horizontally, comprising:

a horizontally arranged, tubular encapsulating housing with feeders and outgoers arranged transversely with respect to an axis of the encapsulating housing, the encapsulating housing having a connecting sleeve with a connecting flange for each feeder and outgoer, and each connecting flange having an associated outdoor high-voltage bushing; and a high-voltage bushing comprising:

a hollow insulator having a high-voltage connection arranged at an upper end, a foot part which grips a lower end and is provided with a mounting flange, and an electrical conductor running in an axial direction of the hollow insulator, wherein the foot part is in the form of a curved housing part, in which a flange plane of the mounting flange is inclined at an angle, which is less than about 900, to an axis of the hollow insulator, and a post insulator arranged in the foot part to stabilize a connecting piece, on which a contact piece is mounted for connection of the electrical conductor and for connection of a current path of the encapsulated high-voltage system, wherein a flange plane of at least one connecting flange associated with the high-voltage bushing is arranged horizontally.

\* \* \* \* \*